March 19, 1940.  A. A. WOODWARD  2,194,252
TWO CYCLE INTERNAL COMBUSTION ENGINE VALVE MECHANISM
Filed Sept. 19, 1938  3 Sheets-Sheet 1
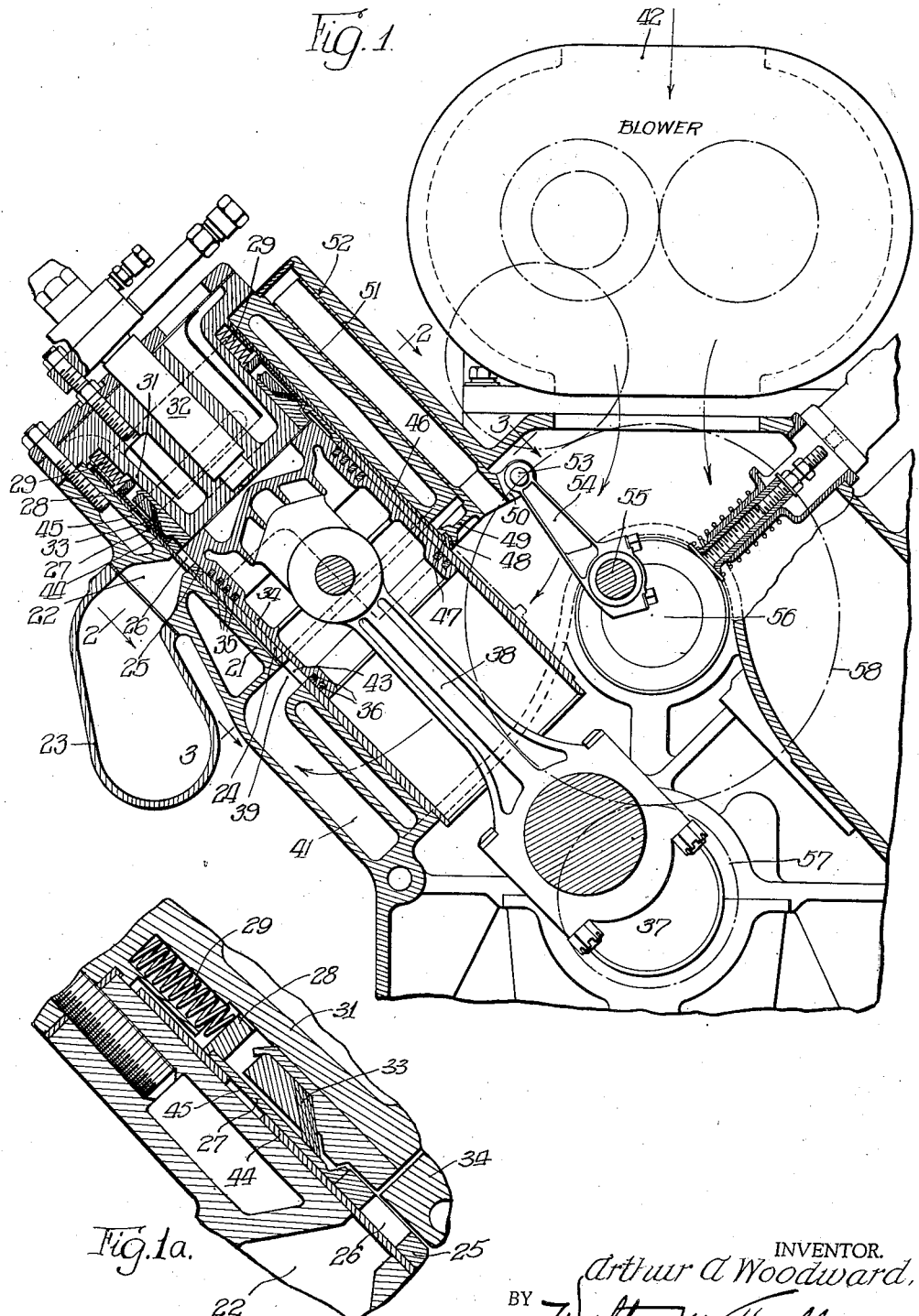
INVENTOR.
Arthur A. Woodward,
BY Walter M. Fuller
ATTORNEY.

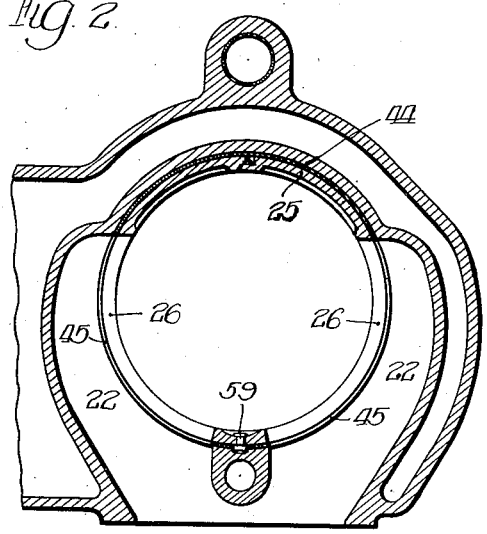
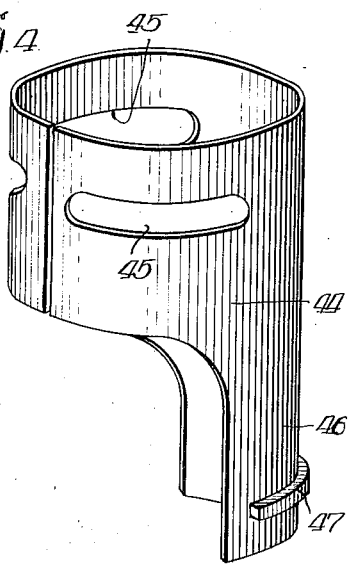
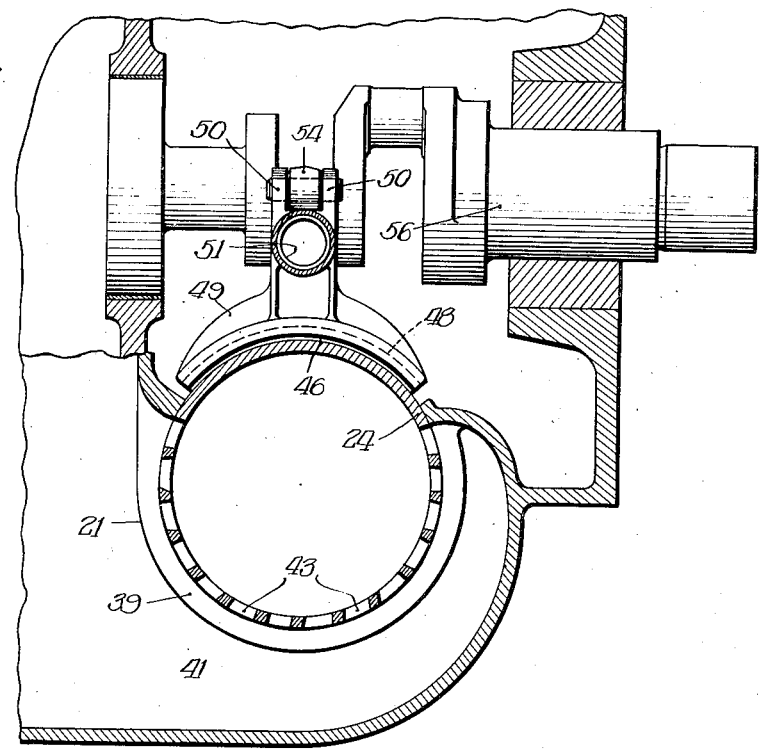

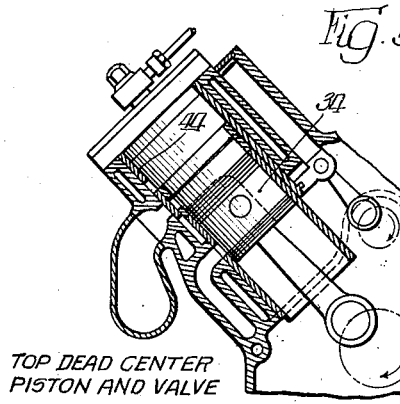

TOP DEAD CENTER
PISTON AND VALVE

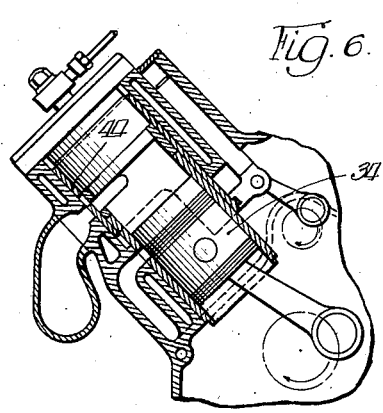

EXHAUST OPENING ON DOWN STROKE
OF VALVE
INTAKE WILL OPEN DOWN STROKE OF PISTON

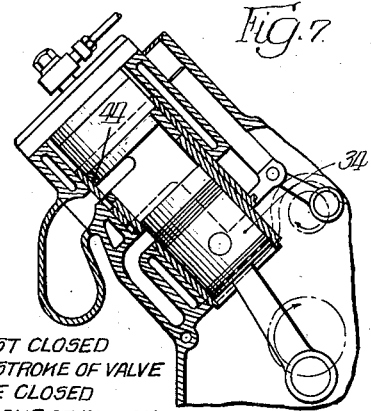

EXHAUST CLOSED
DOWN STROKE OF VALVE
INTAKE CLOSED
UPSTROKE OF PISTON

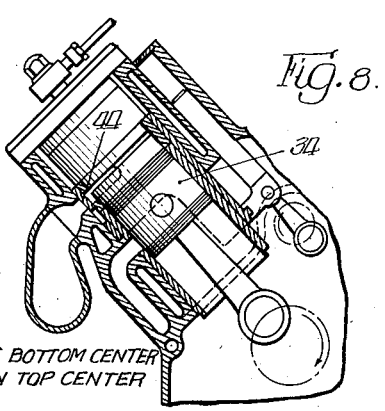

VALVE BOTTOM CENTER
PISTON TOP CENTER

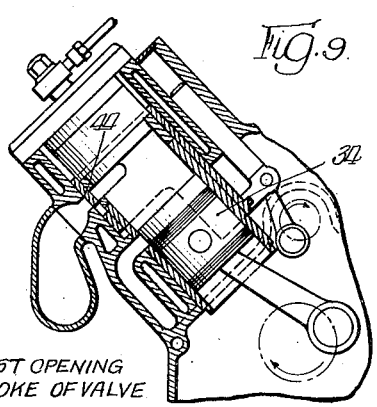

EXHAUST OPENING
UP STROKE OF VALVE
INTAKE ALMOST OPENING
DOWN STROKE OF PISTON

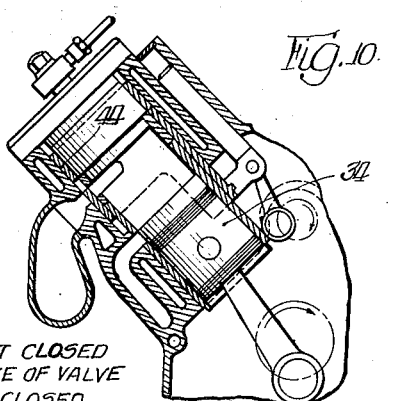

EXHAUST CLOSED
UPSTROKE OF VALVE
INTAKE CLOSED
UPSTROKE OF PISTON

Patented Mar. 19, 1940

2,194,252

UNITED STATES PATENT OFFICE 2,194,252

TWO CYCLE INTERNAL COMBUSTION ENGINE VALVE MECHANISM

Arthur A. Woodward, Detroit, Mich., assignor to Skinner Motors, Inc., Detroit, Mich., a corporation of Delaware Application September 19, 1938, Serial No. 230,610

21 Claims. (Cl. 123—65)

The current invention pertains more especially to certain novel structural features and accruing functional advantages in fuel-injection compression-ignition, or so-called "Diesel", and fuel-injection spark-ignition, internal-combustion engines and more particularly, but not necessarily restrictedly, to engines of the two-cycle type.

One aim of the invention is to provide an engine of the designated character utilizing the uniflow type of scavenge, or expulsion of the exploded gases, with the discharge or exhaust port or ports at the upper or outer end of the cylinder controlled by a slide-valve, a further purpose of the invention being to so design the structure that the valve-gear may be operated at one-half engine-speed, thus, besides other advantages, reducing the loads imposed by the valve-gear mechanism.

Heretofore, engines of the general type referred to have been restricted in one manner or another by their valve-mechanisms, in that, for example, those engines having a single piston per cylinder were unable to obtain sufficiently adequate scavenge properties to enable them to operate at high speeds and large outputs.

Again, prior engines of the class mentioned having poppet-valves in the cylinder-heads were not only greatly limited as to their breathing capacities, but they were also objectionable from the standpoints of noise, shock-loading in the valve-gear, and detrimental factors due to mechanical and thermal stresses in the cylinder-heads.

In the present new and improved engine construction, the cylinder-heads are completely free from all valve-gears, and, therefore, such heads are not affected by forces developed by the valve-mechanisms and are not subjected to any mechanical and thermal stresses other than those resulting from the compression and fuel-combustion.

Furthermore, in such novel engine, the breathing efficiency is extraordinarily high in comparison with that of any other style of valve-gear due to the successful attainment of a very large exhaust-port area in proportion to cylinder size.

Moreover, the fact that the slide valve-gear used is operated at one-half engine-speed not only reduces mechanical strains and stresses in the valve-gear, but it improves the heat condition by causing the exhaust "blow-down" of any two successive explosions to be directed upon different parts of the exhaust-valve mechanism.

In addition, in the new design of engine, the piston-rings are not exposed to the severe heat-conditions of the exhaust "blow-down".

The manner of attainment of the above-noted and other aims and objects of the invention will be readily understood by those skilled in this art from a comprehension of the construction and mode of operation of a present preferred embodiment of the invention illustrated in the accompanying drawings, constituting a part of this specification, and throughout the views of which like reference numerals have been employed to designate the same mechanical elements, but it is to be noted that the invention is susceptible of a variety of embodiments and that major and minor structural modifications may be resorted to in the detailed construction without departure from the heart and essence of the invention as defined by the appended claims, which should be construed or interpreted as generically as the state of the prior art will permit, and without the loss or sacrifice of any of the material benefits and advantages accruing from the use of the invention.

In these drawings:

Figure 1 is a fragmentary, vertical, cross-section through one cylinder of the engine;

Figure 1A is a partial cross-section through a portion of the engine on a considerably enlarged scale.

Figure 2 is a partial, horizontal section on line 2—2 of Figure 1;

Figure 3 is a partial, horizontal section on line 3—3 of Figure 1;

Figure 4 is a perspective view of the sleeve-valve; and

Figures 5 to 10 inclusive show the various steps in the operation of the engine.

The engine illustrated in these drawings is a V-shaped, four-cylinder, two-cycle, slide-valve, Diesel engine, but the invention is equally well adapted for use in a fuel-injection spark-ignition internal-combustion engine or the so-called "Hesselman" type and also in the carburetor-style of engine.

Each outer-cylinder 21 of such multi-cylinder engine is water-jacketed or otherwise cooled and in its upper part it has two exhaust-ports 22, 22 (which may be considered as a single bridged port) discharging into an exhaust-manifold 23, each such cylinder having an inner, shorter, cylinder 24 concentric with, and spaced inwardly from, the outer-cylinder, thereby providing a shallow, annular space between them, such inner-cylinder being supported desirably from its lower end by the outer cylinder-casting, as is clearly illustrated, the inner cylinder terminating short of the exhaust-ports 22, 22 so as not to close them either wholly or in part.

Resting on the upper or outer end of such inner-cylinder is a split, expansible sealing-ring 25 having ports 26, 26 through it in register with the exhaust-ports of the outer-cylinder, and, bearing on top of this sealing-ring, is an endless hold-down ring 27 having around its lower margin an inwardly-directed flange on which the gas-pressures in the cylinders may act to hold the ring down in position.

On top of the hold-down ring 27 is another endless ring 28 pressed down by a number of short helical-springs 29, 29 accommodated in part in cavities in the suitably-shaped cylinder-head 31 mounted in appropriate manner in the end of the cylinder and fitted with a central, Bosch, fuel-injector unit and nozzle 32.

In addition, the cylinder-head 31 is equipped with a group of nested, tapered, resilient metal-reeds 33 anchored to the cylinder-head and pressing at their outer, circular peripheries against the inner face of the hold-down ring 27.

The foregoing construction and arrangement of parts are much like those presented in U. S. Patent 1,830,136, Skinner, Internal-combustion engine, granted November 3, 1931 to which reference is hereby made.

Slidable in the inner-cylinder is a piston 34 having sets of suitable piston-rings 35 and 36 near the top and bottom of the piston, respectively, such piston being operatively joined to the main crank-shaft 37 of the engine by the customary connecting-rod 38.

The specified outer-cylinder 21, about midway between the cylinder-head 31 and the inner or lower end of the cylinder, has an air-inlet port 39 (Figure 3) extending nearly three-quarters around the cylinder, such intake-port by a conduit or passage 41 being connected to an air-blower 42 (Figure 1) operated by the engine and adapted to deliver air under suitable pressure through such passage to the port, the inner-cylinder having a bridged or divided intake-port 43 in register with such port 39, whereby the air enters the inner-cylinder when the piston, which during its reciprocation governs the opening and closing of such inner-cylinder port, opens it in the usual manner customary to two-cycle engines.

A longitudinally-split, cylindrical sleeve-valve 44 having ports 45, 45 slides in the annular space between the outer-cylinder 21, on the one hand, and the inner-cylinder, sealing-ring, and hold-down ring, on the other hand, to bring its ports into and out of register with the cylinder exhaust-ports 22, 22 and the registered sealing-ring exhaust-ports 26, 26, whereby to open and to close the same, such split sleeve-valve having a downward or inward extension 46 equipped near its end with an outstanding, curved rib or tongue 47 occupying a correspondingly-shaped groove or channel 48 in a valve-operating reciprocatory-member 49 having a hollow, cylindrical guide-rod or shaft 51 sliding in a bearing 52 in the engine-casting parallel to the axis of the outer and inner cylinders, such element 49 having apertured, spaced-apart ears or lugs 50, 50 accommodating a hinge-pin 53 for the smaller end of a connecting-rod 54 whose opposite larger end fits about a throw or crank-pin 55 of a single, suitably-journalled, valve-operating crank-shaft 56 common to all of the valves of the engine, such valve-shaft 56 being rotated as by gears 57 and 58, illustrated conventionally, operatively connecting it with, and revolved at one-half the speed of, the engine main crank-shaft 37.

As is shown in Figure 2, in order to prevent the sealing-ring 25 and the sleeve-valve 44 from turning or rotating, the ring is provided with a locating or positioning pin 59 extended through the slit of the valve into a cavity in the inner surface of the outer-cylinder.

Obviously, and as is well understood in the art, every time the piston descends and opens the registered intake-ports of the outer and inner cylinders, the air under pressure rushes into the inner-cylinder, forces the previously-combusted gases out of the exhaust-ports ahead of it, thus effectively scavenging and expurgating the cylinders, and charges the latter with relatively pure air which is compressed during the ascent of the piston, and receives its supply of fuel under pressure from the nozzle, the subsequent explosion forcing the piston down, whereupon such cycle is repeated for each complete reciprocation of the piston.

The ports 45, 45 in the reciprocating sleeve-valve 44 are so situated that they come into full register with the exhaust-ports of the sealing-ring and cylinder-block at a time when the valve-shaft 56 is rotated approximately 90° from the position in which it is shown in the drawings, the result of this construction being that the valve-ports 45, 45 register with the exhaust-ports of the sealing-ring and outer-cylinder twice for every revolution of the valve-shaft 56.

If such valve-shaft 56 is considered as slowly rotating counter-clockwise as viewed in Figure 1 of the drawings, such rotation will result in first drawing the sleeve-valve downwardly toward the crank-case of the engine, and, as this is done, the valve-ports 45, 45 move lower and lower until they reach a point at which their lower edges coincide with the upper edges of the sealing-ring ports 26, 26 and this will occur when such valve-shaft has been rotated about 70°.

As this point in the valve-travel is passed, the hot exhaust-gases within the cylinder rush out through the opening formed between such edges, this portion of the exhaust-stroke being known as the "blow-down" of the cylinder, and it will be apparent that at this time the lower edges of the ports 45, 45 and the upper edges of the ports 26, 26 are subjected to the heat of this exhaust blow-down on this particular cycle of the engine.

After the valve-shaft has been rotated to a point about 110° from that shown in the drawings, the ports 45, 45 in the sleeve-valve 44 will have been moved downwardly so far that their upper edges will coincide with the lower edges of the ports 26, 26 of the sealing-ring, and, at that point, the exhaust-ports will be closed.

Further rotation of the valve-shaft does not re-open these ports until on its upward stroke the sleeve-valve has risen to such a point that the top edges of the valve-ports 45, 45 coincide with the lower edges of the ports 26, 26 of the sealing-ring, and, as this point is passed, another exhaust blow-down occurs, but the heat thereof is directed now against the upper edge portions of the ports 45, 45 and the lower edge portions of the ports 26, 26 of the sealing-ring.

Thus, it will be perceived that the half engine-speed of the sleeve-valve results in applying the heat of any two successive exhaust blow-downs to different sections of the members employed in the valve-gear and to different parts of sealing-ring and outer-cylinder.

As the valve continues its upward stroke, it reaches a point at which the lower edges of its ports coincide with the upper edges of the sealing-ring ports and at this point the ports are closed, a condition which continues while the valve finishes its upward stroke, returning to the position shown in the drawings.

During this cycle of operations, the engine main crank-shaft 37 has made two complete revolutions by reason of the fact that the valve-shaft 56 is geared to the shaft 37 in such manner that the valve-shaft rotates only one-half as fast as the main crank-shaft, and, therefore, one complete revolution of the valve-shaft 56 represents or corresponds to two complete revolutions of the crank-shaft 37.

Since this is a two-cycle engine firing every revolution of the main crank-shaft, two explosions have occurred in the engine-cylinder during one complete revolution of the valve-shaft.

Referring to Figure 2 of the drawings, showing a section through the exhaust-ports, the great total area of the two ports 45 and of the two ports 26 can easily be seen and this very large unobstructed area for the free outward flow or discharge of the exhaust-gases is an important factor in enabling this new type of two-cycle engine to be operated at high speeds with large specific outputs.

I claim:

1. In an internal-combustion engine of the type having an outer-cylinder with an exhaust-port, an inner-cylinder inside of, concentric with, and spaced inwardly from, said outer-cylinder and terminating short of said exhaust-port, a piston reciprocatory in said inner-cylinder, a rotary-shaft, means operatively connecting said piston with said shaft, and means to seal the pressures in said cylinders beyond said piston including a longitudinally-split sealing-ring bearing on an end of said inner-cylinder, having an exhaust-port in register with said outer-cylinder exhaust-port, and tending to expand, the incorporation of a unitary thin longitudinally-split cylindrical sleeve-valve between said outer-cylinder on the one hand and said inner-cylinder and said sealing-ring on the other hand, in combination with means to reciprocate said sleeve-valve lengthwise to open and to close said registered exhaust-ports.

2. In a two-cycle internal-combustion engine of the type having an outer-cylinder with an exhaust-port, an inner-cylinder inside of, concentric with, and spaced inwardly from, said outer-cylinder and terminating short of said exhaust-port, a piston reciprocatory in said inner-cylinder, a rotary-shaft, means operatively connecting said piston with said shaft, and means to seal the pressures in said cylinders beyond said piston including a longitudinally-split sealing-ring bearing on an end of said inner-cylinder, having an exhaust-port in register with said outer-cylinder exhaust-port, and tending to expand, the provision in said inner and outer cylinders of registered inlet-ports positioned to be opened and closed by said piston during its reciprocation, and the incorporation of a unitary thin longitudinally-split cylindrical sleeve-valve between said outer-cylinder on the one hand and said inner-cylinder and said sealing-ring on the other hand, in combination with means to reciprocate said sleeve-valve lengthwise to open and to close said registered exhaust-ports.

3. The engine set forth in claim 1 in which said sleeve-valve reciprocatory-means causes said valve to open said exhaust-ports more than once during each complete cycle of travel of the valve.

4. The engine set forth in claim 1 in which said sleeve-valve reciprocating-means causes said valve to open said exhaust-ports fully twice during each complete cycle of travel of the valve.

5. The engine set forth in claim 2 in which said sleeve-valve reciprocating-means causes said valve to open said registered exhaust-ports more than once during each complete cycle of travel of the valve.

6. The engine set forth in claim 2 in which said sleeve-valve reciprocating-means causes said valve to open said registered exhaust-ports fully twice during each complete cycle of travel of the valve.

7. The engine set forth in claim 1 in which said sleeve-valve has an exhaust-port therethrough and in which said sleeve-valve reciprocating-means slides said valve to carry its port beyond said outer-cylinder exhaust-port alternately in opposite directions to close said outer-cylinder exhaust-port.

8. The engine set forth in claim 2 in which said sleeve-valve has an exhaust-port therethrough and in which said sleeve-valve reciprocating-means slides said valve to carry its exhaust-port beyond said outer-cylinder exhaust-port alternately in opposite directions to close said outer-cylinder exhaust-port.

9. The engine set forth in claim 1 in which said sleeve-valve has an exhaust-port therethrough and in which said sleeve-valve reciprocating-means slides said valve to carry its port into register with said outer-cylinder exhaust-port to open the latter successively while said valve is traveling alternately in opposite directions.

10. The engine set forth in claim 2 in which said sleeve-valve has an exhaust-port therethrough and in which said sleeve-valve reciprocating-means slides said valve to carry its exhaust-port into register with said outer-cylinder exhaust-port to open the latter successively while the valve is traveling alternately in opposite directions.

11. The engine set forth in claim 1 in which said valve-reciprocating means includes a shaft revolving at one-half the speed of rotation of said rotary-shaft.

12. The engine set forth in claim 2 in which said valve-reciprocating means includes a shaft revolving at one-half the speed of rotation of said rotary-shaft.

13. The engine set forth in claim 1 in which said valve-reciprocating means includes a shaft revolving at one-half the speed of rotation of said rotary-shaft and in which said valve opens said exhaust-ports fully twice during each complete cycle of travel of the valve.

14. The engine set forth in claim 2 in which said valve-reciprocating means includes a shaft revolving at one-half the speed of rotation of said rotary-shaft and in which said valve opens said exhaust-ports fully twice during each complete cycle of travel of the valve.

15. The engine set forth in claim 1 in which said sleeve-valve has an exhaust-port therethrough and in which said sleeve-valve reciprocating-means includes a shaft revolving at one-half the speed of rotation of said rotary-shaft, said valve carrying its port beyond said outer-cylinder exhaust-port alternately in opposite directions to close said outer-cylinder exhaust-port.

16. The engine set forth in claim 2 in which said sleeve-valve has an exhaust-port therethrough and in which said sleeve-valve reciprocating-means includes a shaft revolving at one-half the speed of rotation of said rotary-shaft, said valve carrying its port beyond said outer-cylinder exhaust-port alternately in opposite directions to close said outer-cylinder exhaust-port 17. The engine set forth in claim 1 in which said sleeve-valve has an exhaust-port therethrough and in which said sleeve-valve reciprocating-means includes a shaft revolving at one-half the speed of rotation of said rotary-shaft, said valve carrying its port into register with said outer-cylinder exhaust-port to open the latter successively while said valve is traveling alternately in opposite directions.

18. The engine set forth in claim 2 in which said sleeve-valve has an exhaust-port therethrough and in which said sleeve-valve reciprocating-means includes a shaft revolving at one-half the speed of rotation of said rotary-shaft, said valve carrying its port into register with said outer-cylinder exhaust-port to open the latter successively while said valve is traveling alternately in opposite directions.

19. In an internal-combusiton engine of the type having an outer cylinder with an exhaust-port, an inner-cylinder inside of, concentric with, and spaced inwardly from, said outer cylinder, a piston reciprocatory in, and in direct juxtaposition with, said inner-cylinder, a rotary-shaft, and means operatively connecting said piston with said shaft, the employment of a single-sleeve valve at least in part between said cylinders, in combination with means to reciprocate said valve in a straight path lengthwise to open and to close said exhaust-port, and means to seal the pressures in said outer cylinder during a portion of each cycle of operation of the valve.

20. In a two-cycle internal-combustion engine of the type having an outer-cylinder with an exhaust-port, an inner-cylinder inside of, concentric with, and spaced inwardly from said outer-cylinder, a piston reciprocatory in, and in direct juxtaposition with, said inner-cylinder, a rotary-shaft, and means operatively connecting said piston with said shaft, the employment of a single-sleeve exhaust-valve at least in part between said cylinders, in combination with means to reciprocate said valve in a straight path to open and close said exhaust-port, an inlet-port opened and closed by the movements of said piston, and means to seal the pressures in said outer-cylinder during a portion of each cycle of operation of said piston.

21. The engine set forth in claim 20 in which said valve-reciprocating means includes a shaft revolving at one-half of the speed of rotation of said rotary-shaft, and in which said exhaust-valve has an exhaust-port therethrough traveling in opposite directions in successive openings of said cylinder exhaust-port.

ARTHUR A. WOODWARD.